(12) United States Patent
Stählin

(10) Patent No.: US 9,735,976 B2
(45) Date of Patent: Aug. 15, 2017

(54) METHOD AND DEVICE FOR VEHICLE COMMUNICATION

(71) Applicant: CONTINENTAL AUTOMOTIVE GMBH, Hannover (DE)

(72) Inventor: Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 141 days.

(21) Appl. No.: 14/429,318

(22) PCT Filed: Sep. 17, 2013

(86) PCT No.: PCT/EP2013/069265
§ 371 (c)(1),
(2) Date: Mar. 18, 2015

(87) PCT Pub. No.: WO2014/044671
PCT Pub. Date: Mar. 27, 2014

(65) Prior Publication Data
US 2015/0249541 A1    Sep. 3, 2015

(30) Foreign Application Priority Data

Sep. 19, 2012 (DE) .................. 10 2012 216 827

(51) Int. Cl.
*H04L 12/18* (2006.01)
*H04L 29/08* (2006.01)
*H04W 4/04* (2009.01)

(52) U.S. Cl.
CPC ........... *H04L 12/189* (2013.01); *H04L 67/12* (2013.01); *H04W 4/046* (2013.01)

(58) Field of Classification Search
CPC ........ H04W 4/046; H04W 4/12; H04L 67/12; H04L 2209/84; H04L 12/189;
(Continued)

(56) References Cited

U.S. PATENT DOCUMENTS 7,246,000 B2 * 7/2007 Odagawa ............. G08G 1/164
303/191
7,673,039 B2 * 3/2010 Sakamoto .......... G07C 9/00111
340/10.42
(Continued)

FOREIGN PATENT DOCUMENTS

DE    10 2007 045 519 A1    4/2009
FR    2 926 690 A1    7/2009

OTHER PUBLICATIONS

"Car 2 Car Communication Consortium Manifesto", Aug. 28, 2007, pp. 1-17.
(Continued)

*Primary Examiner* — Hoang-Chuong Vu
(74) *Attorney, Agent, or Firm* — Cozen O'Connor

(57) ABSTRACT

In a method for vehicle communication, a first vehicle provides first data for communication with a server. The first data is transmitted to a server by radio using a first communication protocol. The server transmits second data to a second vehicle by radio using the first communication protocol, the second data being determined depending on the first data. Depending on the second data, third data is transmitted by the second vehicle to a third vehicle by radio using a second communication protocol.

10 Claims, 1 Drawing Sheet

(58) Field of Classification Search
CPC ........... G08G 1/096775; G08G 1/0967; G08G 1/096783; G08G 1/096791; G08G 1/091
See application file for complete search history.

(56) References Cited

U.S. PATENT DOCUMENTS

| | | |
|---|---|---|
| 2002/0022927 A1 | 2/2002 | Lemelson et al. |
| 2003/0052796 A1* | 3/2003 | Schmidt ............... G01S 5/0027 340/905 |
| 2005/0065711 A1 | 3/2005 | Dahlgren et al. |
| 2007/0126603 A1* | 6/2007 | Driscoll .................. G08G 1/14 340/988 |
| 2009/0072997 A1* | 3/2009 | Shrum, Jr. ............. G08G 1/127 340/905 |
| 2011/0018736 A1* | 1/2011 | Carr ..................... G08G 1/0965 340/902 |
| 2011/0063129 A1 | 3/2011 | Stahlin |
| 2011/0187559 A1* | 8/2011 | Applebaum ............. B60Q 1/00 340/907 |
| 2012/0313768 A1* | 12/2012 | Campbell ........... B60R 25/2009 340/438 |
| 2013/0141247 A1* | 6/2013 | Ricci ......................... G06F 9/54 340/870.01 |
| 2013/0325305 A1* | 12/2013 | Foti .................. G08G 1/096775 701/117 |
| 2014/0136414 A1* | 5/2014 | Abhyanker ............ G06Q 50/28 705/44 |
| 2016/0189544 A1* | 6/2016 | Ricci ..................... G07C 5/008 701/117 |

OTHER PUBLICATIONS

Dikaiakos et al. "Location-Aware Services over Vehicular Ad-Hoc Networks using Car-to-Car Communication", IEEE Journal on Selected Areas in Communications, IEEE Service Center, Oct. 1, 2007, pp. 1590-1602.

* cited by examiner

METHOD AND DEVICE FOR VEHICLE COMMUNICATION

CROSS-REFERENCE TO RELATED APPLICATIONS

This is a U.S. national stage of application No. PCT/EP2013/069265, filed on 17 Sep. 2013, which claims priority to the German Application No. DE 10 2012 216 827.3 filed 19 Sep. 2012, the content of both incorporated herein by reference.

BACKGROUND OF THE INVENTION

1. Field of the Invention

The invention relates to a method and a corresponding device for vehicle communication.

2. Related Art

In accident situations or hazardous situations, it is important for vehicles to be warned of such situations. However, not every vehicle has the technology to communicate with other vehicles. This complicates communication between different vehicles.

DE 10 2007 045 519 A1 discloses communication in which a first vehicle transmits a multicast message, together with the GPS location of the first vehicle, to a server using a communication device. The server can decide to whom the multicast message is intended to be forwarded.

FR 2 926 690 A1 discloses communication between a vehicle and a communication terminal. If it is not possible to transmit a message to the communication terminal using a wireless communication device in the vehicle, the message is transmitted to a wireless communication device in a second vehicle and is transmitted from there to the communication terminal.

SUMMARY OF THE INVENTION

An object of the invention is to provide a method and a corresponding device for enabling vehicle communication between a first, a second and a third vehicle.

According to one aspect, the invention is distinguished by a method and a corresponding device for vehicle communication, in which a first vehicle provides first data for communicating with a server. The first data are transmitted to the server by radio technology using a first communication protocol. Second data are transmitted from the server to a second vehicle by radio technology using the first communication protocol, the second data being determined on the basis of the first data. Third data are transmitted from the second vehicle to a third vehicle by radio technology using a second communication protocol, the third data being determined on the basis of the second data.

By virtue of the fact that first data are transmitted from the first vehicle to a server, it may not be necessary for the first vehicle to have technology for communicating with other vehicles. The server can transmit the data to a second vehicle from which the data can be forwarded to other vehicles. Data can be transmitted to other vehicles even though the first vehicle is not able to transmit data to other vehicles. In addition, it is also not necessary for the server to communicate with a plurality of vehicles since the server transmits the second data to a vehicle, which can communicate with other vehicles.

According to one advantageous refinement, the second data are transmitted from the server to the second vehicle on the basis of stored vehicle data relating to the first vehicle. This makes it possible for the server, for example, to determine that the vehicle does not have the technology to transmit the first data to a second vehicle. If this is the case or there are possibly other reasons, the server can transmit second data to the second vehicle.

According to another advantageous refinement, the second data are transmitted from the server to the second vehicle on the basis of the first data.

This makes it possible to determine, for example, in the server that the first vehicle is not able to transmit data to other vehicles, for example on account of problems, and to then transmit the second data, for example, to the second vehicle.

According to another advantageous refinement, the first data are provided on the basis of a traffic accident involving the first vehicle. In accident situations in particular, it is important for other vehicles to be warned of the accident; this makes it possible for other vehicles to be warned in the event of an accident, in particular.

According to another advantageous refinement, the first vehicle has an environment sensor designed to sense the environment around the first vehicle. It is determined, on the basis of sensor data from the environment sensor, whether there is a hazardous area in the environment of the vehicle. If it is determined that there is a hazardous area in the environment of the vehicle, the first data are provided. This makes it possible to warn other vehicles of a hazardous area as soon as the hazardous area has been detected by the first vehicle.

According to one advantageous refinement, the first data have the current position of the first vehicle. This makes it possible to inform other vehicles of the position of the first vehicle.

According to one advantageous refinement, the first data have information relating to the vehicle state of the first vehicle.

This makes it possible to communicate whether the first vehicle has had a serious accident, for example.

According to another advantageous refinement, the data have information relating to the environment of the first vehicle. This makes it possible to communicate, for example, whether a serious accident has taken place in the environment of the first vehicle.

BRIEF DESCRIPTION OF THE DRAWINGS

Exemplary embodiments of the invention are explained in more detail below using the schematic drawings, in which.

DETAILED DESCRIPTION OF THE PRESENTLY PREFERRED EMBODIMENTS

Figure 1:
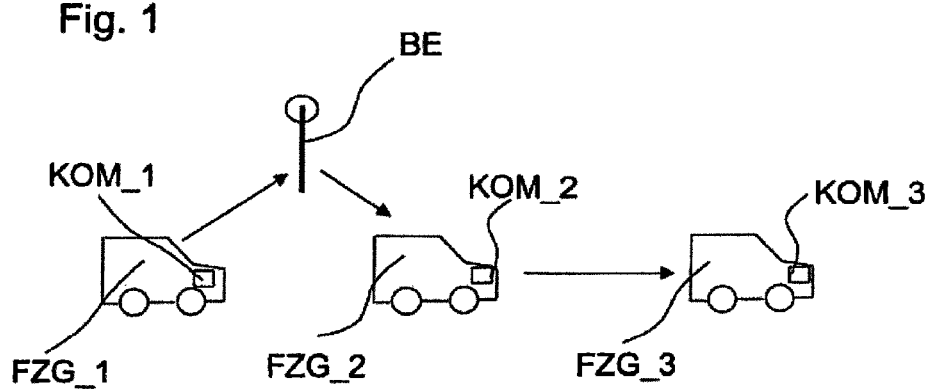
FIG. 1 shows vehicle communication.

Elements with the same design or function are labeled with the same reference symbols throughout the figures. In a first exemplary embodiment (FIG. 1), a first vehicle FZG_1 has a first communication apparatus KOM_1. The first communication apparatus KOM_1 has a computing unit and a data and program memory. The first communication apparatus KOM_1 may be in the form of one structural unit or may be distributed to two or more structural units. The first communication apparatus KOM_1 is configured to transmit first data DATA_1 to a server BE.

The first data DATA_1 have, for example, the current position of the first vehicle FZG_1 and/or information relating to the vehicle state of the first vehicle FZG_1 and/or information relating to the environment of the first vehicle FZG_1 and/or vehicle data relating to the first vehicle FZG_1. The first data DATA_1 may have, for example, information relating to an accident involving the first vehicle FZG_1 and/or information relating to whether the first vehicle FZG_1 has technology for vehicle-to-vehicle communication. If the first vehicle FZG_1 has an environment sensor configured to sense the environment around the first vehicle FZG_1, the first data DATA_1 may alternatively or additionally have information relating to a hazardous area in the environment of the first vehicle FZG_1, which area has been detected by the environment sensor.

The server BE may be, for example, a central or decentralized server BE and/or a vehicle backend of a vehicle manufacturer, for example, and/or a backend independent of the vehicle brand. The server BE may determine, for example on the basis of stored vehicle data relating to the first vehicle FZG_1 and/or on the basis of the first data DATA_1, whether it is not possible for the first vehicle FZG_1 to set up communication with another vehicle. The information indicating that the first vehicle FZG_1 does not have the necessary technology to establish vehicle-to-vehicle communication can possibly be gathered from the stored vehicle data. Alternatively or additionally, the first data DATA_1 may contain, for example, the information indicating that the first vehicle FZG_1 at the moment cannot set up vehicle-to-vehicle communication, for example on account of damage or on account of an empty vehicle battery. In such cases, or for other reasons, the server BE can transmit second data DATA_2 to a second communication apparatus KOM_2 in a second vehicle FZG_2.

The second communication apparatus KOM_2 has a computing unit and a data and program memory. The second communication apparatus KOM_2 may be in the form of one structural unit or may be distributed to two or more structural units. The second communication apparatus KOM_2 is configured to receive the second data DATA_2 from the server BE and to transmit third data DATA_3 to a third vehicle FZG_3.

The second data DATA_2 are determined on the basis of the first data DATA_1 and contain at least some of the first data DATA_1.

The first data DATA_1 and the second data DATA_2 are transmitted by radio technology using a first communication protocol. This is, for example, GSM, UMTS, LTE, 802.11a-802.11y, Bluetooth, ZigBee, WiMax, Wifi-Direct, infrared and/or ITS-G5.

The second communication apparatus KOM_2 in the second vehicle FZG_2 can transmit the third data DATA_3 to a third communication apparatus KOM_3 in a third vehicle FZG_3 on the basis of the second data DATA_2 by radio technology using a second communication protocol. The third data DATA_3 contain at least some of the second data DATA_2 and/or at least some of the first data DATA_1.

The second communication protocol is, for example, GSM, UMTS, LTE, 802.11a-802.11y, Bluetooth, ZigBee, WiMax, Wifi-Direct, infrared and/or ITS-G5, the first and second communication protocols being different.

Figure 2:
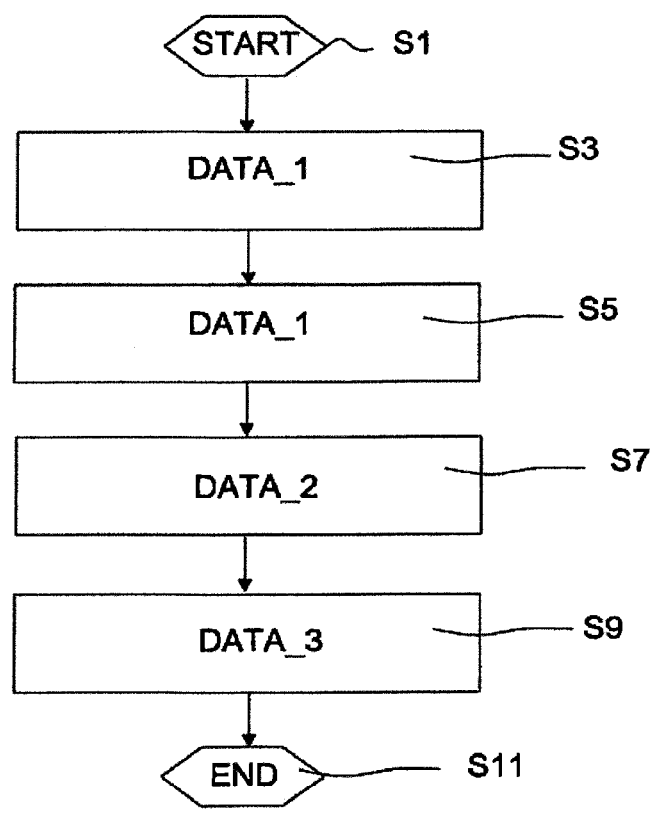
FIG. 2 shows a flowchart.

FIG. 2 is a flowchart representative of a program executed in a manner distributed to the communication apparatuses in the vehicles and to the server BE. The program is started in step S1, in which variables can possibly be initialized.

In a subsequent step S3, the first data DATA_1 are provided. The first data DATA_1 are provided, for example, by the environment sensor and/or by other vehicle sensors and/or by a control apparatus of the first vehicle FZG_1.

In a subsequent step S5, the first data DATA_1 are transmitted to the server BE by radio technology using the first communication protocol.

In a subsequent step S7, the second data DATA_2, which have been determined on the basis of the first data DATA_1, are transmitted from the server BE to the second vehicle FZG_2 by radio technology using the first communication protocol.

In a subsequent step S9, the third data DATA_3, which have been determined on the basis of the second data DATA_2, are transmitted from the second vehicle FZG_2 to the third vehicle FZG_3 by radio technology using the second communication protocol.

In a subsequent step S11, the program is ended and can possibly be started again in step S1.

The invention makes it possible for the first vehicle FZG_1 to transmit the first data DATA_1 to a backend, for example after an accident. The backend transmits the second data DATA_2, for example containing information relating to the accident involving the first vehicle FZG_1, to the second vehicle FZG_2 that is, for example, from the same vehicle manufacturer as the first vehicle FZG_1. So that vehicles from other vehicle manufacturers or vehicles that cannot communicate with the backend now also obtain information relating to the accident, the second vehicle FZG_2 transmits the third data DATA_3 to the third vehicle FZG_3, and possibly to further vehicles.

Alternatively or additionally, the invention makes it possible for the first vehicle FZG_1 to detect a hazardous area, for example using the environment sensor, and to communicate this to the backend using the first data DATA_1. The backend then transmits the second data DATA_2, for example containing information relating to the hazardous area, to the second vehicle FZG_2 that is, for example, from the same vehicle manufacturer as the first vehicle FZG_1. So that vehicles from other vehicle manufacturers or vehicles which cannot communicate with the backend now also obtain information relating to the hazardous area, the second vehicle FZG_2 transmits the third data DATA_3 to the third vehicle FZG_3 and possibly to further vehicles.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method for vehicle communication, comprising:
receiving, by a server (BE), first data (DATA_1) for communicating with the server (BE), the received first data (DATA_1) having been transmitted to the server (BE) from a first vehicle (FZG_1) by radio using a first communication protocol;

determining, by the server (BE), based on the received first data (DATA_1), whether the (FZG_1) is able to transmit data to other vehicles and, if not:

transmitting, by the server (BE), second data (DATA_2) by radio using the first communication protocol to a second vehicle (FZG_2) capable of transmitting data to other vehicles, the second data (DATA_2) being determined on the basis of the first data (DATA_1); and transmitting, by the second vehicle (FZG_2) third data (DATA_3) to a third vehicle (FZG_3) by radio using a second communication protocol, the third data (DATA_3) being determined on the basis of the second data (DATA_2).

2. The method as claimed in claim 1, wherein the second data (DATA_2) are transmitted from the server (BE) to the second vehicle (FZG_2) on the basis of stored vehicle data relating to the first vehicle (FZG_1).

3. The method as claimed in claim 1, wherein the second data (DATA_2) are transmitted from the server (BE) to the second vehicle (FZG_2) on the basis of the first data (DATA_1).

4. The method as claimed in claim 1, wherein the first data (DATA_1) are provided on the basis of a traffic accident involving the first vehicle (FZG_1).

5. The method as claimed in claim 1, wherein
the first vehicle (FZG_1) has an environment sensor configured to sense the environment around the first vehicle (FZG_1),
it is determined, on the basis of the sensor data from the environment sensor, whether there is a hazardous area in the environment of the first vehicle (FZG_1), and
the first data (DATA_1) are provided, if it is determined that there is a hazardous area in the environment of the first vehicle (FZG_1).

6. The method as claimed in claim 1, wherein the first data (DATA_1) include the current position of the first vehicle (FZG_1).

7. The method as claimed in claim 1, wherein the first data (DATA_1) have information relating to the vehicle state of the first vehicle (FZG_1).

8. The method as claimed in claim 1, wherein the first data (DATA_1) have information relating to the environment of the first vehicle (FZG_1).

9. A method for vehicle communication, comprising:
receiving, by a second vehicle (FZG_2) able to transmit data to other vehicles, second data (DATA_2) from a server BE using a first communication protocol, if it has been determined by the server (BE), on the basis of first data (DATA_1) previously provided to the server (BE) by a first vehicle (FZG_1), that the first vehicle (FZG_1) is not able to transmit data to other vehicles, the second data (DATA_2) being determined on the basis of the first data (DATA_1) previously provided to the server (BE) by the first vehicle (FZG_1); and
transmitting, by the second vehicle (FZG_2), third data (DATA_3) to a third vehicle (FZG_3) by radio using a second communication protocol, the third data (DATA_3) being determined on the basis of the second data (DATA_2).

10. A system for communication between vehicles, the system comprising:
a server (BE) configured to:
communicate with a first vehicle (FZG_1) having a first communication apparatus (KOM_1) by radio using a first communication protocol and to receive from the first vehicle (FZG_1) first data (DATA_1);
determine, based on the received first data (DATA_1), whether the first vehicle (FZG_1) is able to transmit data to other vehicles and, if not:
communicate with a second vehicle (FZG_2) having a second communication apparatus (KOM_2) by radio using the first communication protocol and to transmit to the second vehicle (FZG_2) second data (DATA_2) determined on the basis of the first data (DATA_1), the second vehicle (FZG_2) being configured to transmit third data (DATA_3) to a third vehicle (FZG_3) by radio using a second communication protocol, the third data (DATA_3) being determined on the basis of the second data (DATA_2).

* * * * *